United States Patent
Jung et al.

[11] Patent Number: 6,076,900
[45] Date of Patent: Jun. 20, 2000

[54] PROCESS AND DEVICE FOR CONTROLLING A BRAKE SYSTEM OF A VEHICLE

[75] Inventors: Juergen Jung, Schwieberdingen; Norbert Polzin, Zaberfeld; Michael Hund, Ditzingen, all of Germany

[73] Assignee: Robert Bosch GmbH, Stuttgart, Germany

[21] Appl. No.: 08/942,766

[22] Filed: Oct. 2, 1997

[30] Foreign Application Priority Data

Oct. 2, 1996 [DE] Germany .................. 196 40 743

[51] Int. Cl.⁷ ............................................. B60K 28/16
[52] U.S. Cl. .................. 303/156; 303/113.2; 303/168
[58] Field of Search .............................. 303/155, 156, 303/159, 160, 163, 165, 166, 168, 113.2, DIG. 2; 180/197; 701/83

[56] References Cited

U.S. PATENT DOCUMENTS

| | | | |
|---|---|---|---|
| 4,504,911 | 3/1985 | Braschel et al. | 364/426 |
| 4,852,009 | 7/1989 | Jonner et al. | 364/426.02 |
| 5,419,622 | 5/1995 | Burg et al. | 303/100 |
| 5,494,345 | 2/1996 | Inasaki et al. | 303/163 |
| 5,511,865 | 4/1996 | Howell | 303/139 |
| 5,520,448 | 5/1996 | Okubo | 303/148 |
| 5,642,920 | 7/1997 | Luckevich et al. | 303/156 |
| 5,735,585 | 4/1998 | Koike et al. | 303/145 |
| 5,765,929 | 6/1998 | Hirano et al. | 303/167 |

FOREIGN PATENT DOCUMENTS

| | | |
|---|---|---|
| 0 166 258 | 1/1986 | European Pat. Off. . |
| 41 23 783 | 1/1993 | Germany . |

*Primary Examiner*—Chris Schwartz
*Attorney, Agent, or Firm*—Kenyon & Kenyon

[57] ABSTRACT

A process and a device for controlling the brake system of a vehicle, in which in traction control and at the beginning of the control, a braking force build-up independent on the slippage takes place, which is stopped when a sizable braking effect is detected on the spinning wheel. Alternatively or in addition to this system, it is provided that, when the vehicle decelerates in active traction control, the braking force build-up pulses and/or the braking force decrease pulses are determined as a function of the measured slippage of at least one wheel, while outside these areas the pulses are determined so that the increase in braking force takes place in steps with the same change in the braking force.

19 Claims, 3 Drawing Sheets

PROCESS AND DEVICE FOR CONTROLLING A BRAKE SYSTEM OF A VEHICLE

FIELD OF THE INVENTION

The present invention relates to a process and a device for controlling the brake system of a vehicle.

BACKGROUND INFORMATION

European Patent No. 166 258 describes a conventional traction control system which actuates the brake of at least one spinning wheel at the beginning of control with a slippage-independent trigger pulse such that there is contact with the brake shoes, but basically no braking occurs. Thereafter, this conventional control system applies the braking force to the spinning wheel so that slippage is reduced. When determining the first trigger pulse, the temperature of the braking medium is not taken into account, although it has a significant role in the dynamics of braking pressure formation, particularly in hydraulic brakes.

One of the objects of the present invention is to improve the control of a brake system based on the braking medium and brake system temperature.

In a hydraulic brake system, the traction control build-up and decrease pulse times are usually determined so that each pulse results in approximately the same braking pressure change, as described in German Patent Application No. 41 23 783 (corresponding to U.S. Pat. No. 5,419,622). This conventional brake system does not take into account the temperature of the brake system or braking medium.

SUMMARY OF THE INVENTION

The process and device according to the present invention advantageously minimizing the negative influence the temperature of the braking medium and/or of the components of the brake system on the dynamic characteristics of the change in braking force during control. This improves the control of the brake system, particularly at low temperatures.

The process and device according to the present invention provide additional advantages when a hydraulic or pneumatic brake system is used in traction control systems, where the pressure in the wheel brake is applied with satisfactory dynamics at the required pressure level even at very low temperatures. In addition, with the process and device according to the present invention, there is no disadvantage at high temperatures, so that the vehicle traction is sufficient in all temperature ranges.

It is further advantageous that the slippage-dependent pulses following the first braking force build-up pulse are limited to the start phase or to the phase of decreasing travel speed. Thus, there are no negative effects on comfort due to excessive braking force build-up stages.

DETAILED DESCRIPTION OF THE INVENTION

Figure 1:
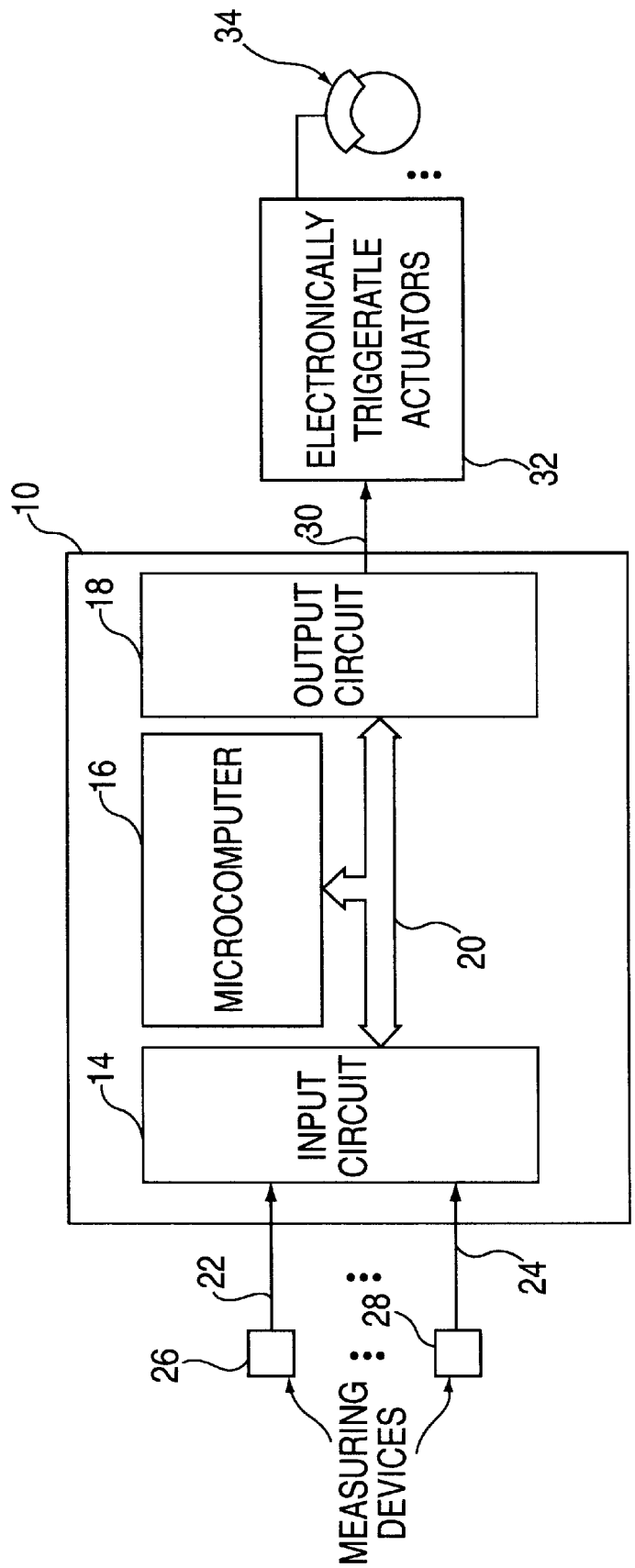
FIG. 1 shows a block diagram of a control unit for controlling the brake system of a vehicle according to the present invention.

FIG. 1 shows a simplified block diagram of an electronic control unit 10, which controls at least one wheel brake 34 of the brake system of a vehicle. Control unit 10 includes an input circuit 14, at least one microcomputer 16, and an output circuit 18. These elements are interconnected via a communication system 20 for mutual data exchange. Input lines 22 through 24 run from measuring devices 26 through 28 to input circuit 14. These measuring devices 26 through 28 detect at least the speeds of the respective vehicle wheels. Furthermore, controller 10 receives other operating parameters (not illustrated), for example, the current torque generated by the vehicle drive unit. Control unit 10 controls electrically triggerable actuators 32 (for example, valves and pumps) via at least one output line 30 connected to output circuit 18. Actuators 32 regulate the braking force of wheel brake 34. Actuators 32 can be, e.g., ABS/ASR valves of a hydraulic or pneumatic brake system, known to one of ordinary skill in the art.

In one embodiment according to the present invention, electronic control unit 10 is an ABS/ASR controller. The tendency to spin for at least one driven wheel is conventionally derived from the wheel speeds supplied for traction control. This is done, for example, by comparing the speed of this wheel with a reference value estimated by using the vehicle speed, and when a predefined difference is exceeded (slippage), the wheel is identified as spinning. In this event, the braking force is built up and/or the drive torque of the engine is affected to reduce slippage.

In a hydraulic brake system, the braking force is built up by triggering a pump and actuating the inlet and discharge valves assigned to the slipping wheel.

In conventional systems, at the beginning of control, the brake caliper of the slipping wheel is first filled using a predefined pulse, and the brake linings are applied. For this purpose, 5 to 10 bar wheel pressure must be built up, which corresponds to a substantial change in volume. Then the pulse pressure is built up until it is decreased again when slippage has disappeared. For controllers with fixed build-up pulse times, the pause time is reduced with increasing wheel dynamics (increasing slippage). Other conventional controllers attempt to vary the build-up pulse times so that the pressure stages are of the same duration for each pressure level. Also in this case, the pause times are reduced with increasing wheel dynamics.

For all such conventional control systems, it is assumed that a given trigger signal results in the same pressure change in all operating states.

The dynamics of the braking pressure build-up are particularly highly dependent on the temperature of the hydraulic fluid and of the brake system components in hydraulic brake systems. At low temperatures the viscosity of the braking fluid is considerably increased. This means that at low temperatures less braking pressure is built up on the wheels in the same build-up time. The control dynamics at low temperature are therefore unsatisfactory with the conventional process.

According to the present invention, the first slippage independent pulse is generated (at a control start) until a predetermined braking effect is detected on the slippage wheel. In one embodiment according to the present invention, the first pulse is ended when the acceleration of the wheel drops below a predefined threshold. The differentiation that determines the acceleration is preferably provided with PT1 filtering in order not to react to typical 10 Hz wheel vibrations. This solution ensures that the first pulse is not interrupted until sufficient braking pressure has built up in the wheel. This measure is particularly effective at low temperatures (approximately −10° C.), since the first pulse is thus extended by a factor of 2 to 3. This measure also works when the driver applies extreme torque ("power start" on $\mu$-split roads), and provides improved traction in this case as well.

In addition, or as an alternative, to the above-mentioned solution, braking force pulses following the first pulse can be extended depending on the detected slippage to improve traction, particularly at low temperatures. The greater the slippage, the longer is the pressure pulse duration. This measure should be adjusted so that there is no negative effect on comfort due to excessively long pressure stages even with warm hydraulics. Therefore it is only used in the start phase. As soon as the transmissible drive torque has been reached on the high wheel, the system switches over to a conventional pressure control as known from the related art. This switch-over also occurs when the vehicle exceeds a minimum speed threshold, i.e., starts moving. Furthermore, switch-over occurs during a control process when the vehicle accelerates during control. The braking force is then built up as a function of slippage, preferably at the beginning of the control cycle, the first time for control purposes, while further braking force build-up phases in the same control cycle are executed by some other procedure.

The first measure for extending the first pulse has no negative effect on comfort when the hydraulics are warm, since the pulse is interrupted before the temperature rises.

Therefore, in summary, the traction is substantially improved at low temperatures by using, e.g., one or both measures without the traction being affected by higher temperatures.

Figure 2:
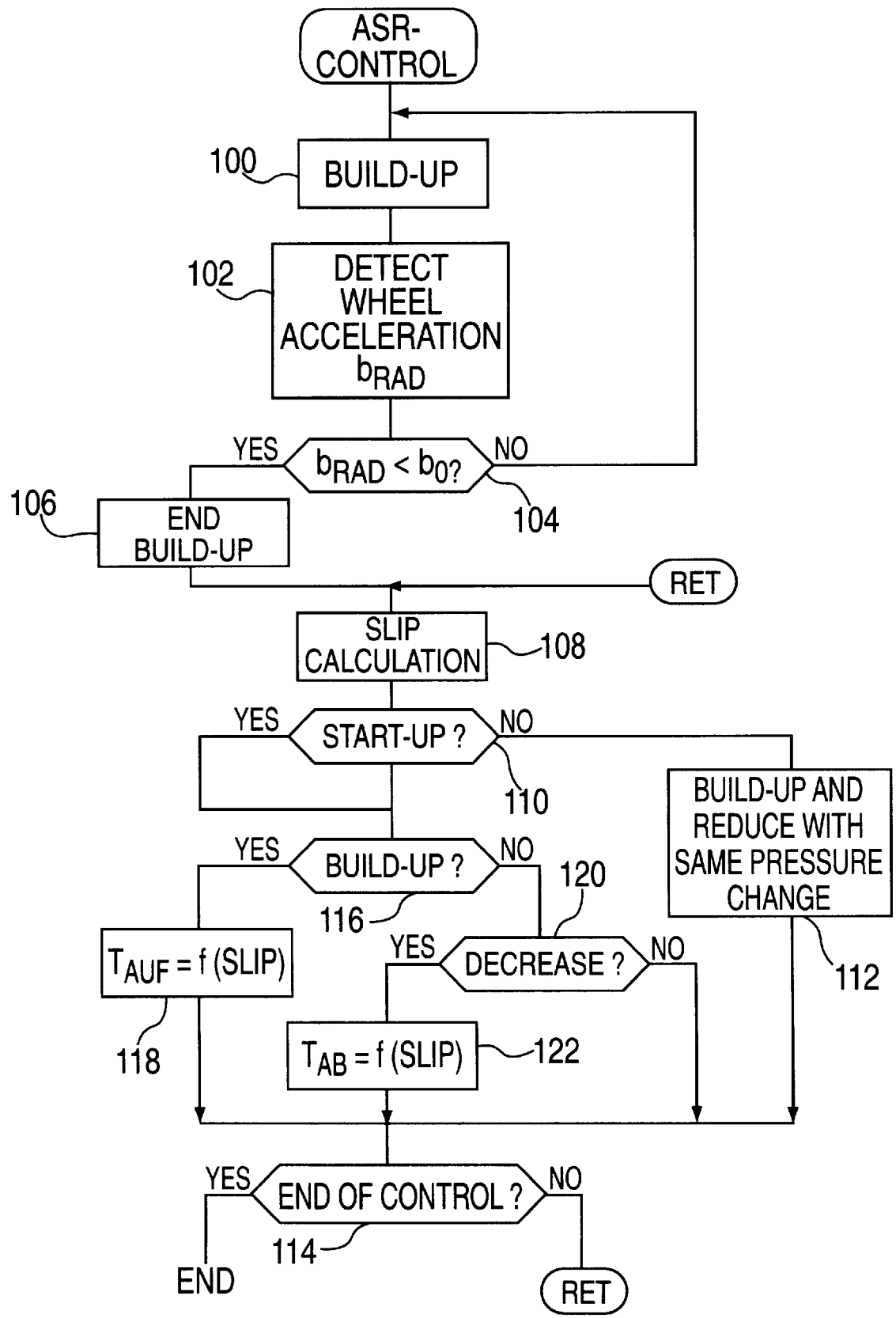
FIG. 2 shows a flow diagram illustrating a program being executed in the microcomputer of the control unit according to the present invention.

The flow diagram of FIG. 2 describes an embodiment according to the present invention, wherein both aforementioned measures are used. This flow diagram represents a program executed by microcomputer 16 of control unit 10.

The program illustrated FIG. 2 is started when a traction control situation is identified and is run for the duration of this control at predefined points in time. A program is provided for each slipping wheel.

After the program start, a trigger pulse for braking force build-up is generated in step 100. Then in step 102, the wheel acceleration is determined on the basis of the speed of the slipping wheel. In the subsequent step 104, this wheel acceleration is checked whether it has exceeded a predefined threshold $b_0$. This indicates that the build-up pulse initiated in step 104 has produced a sizable braking effect. If the wheel acceleration has not dropped below the threshold according to step 104, the pulse is maintained with step 100. Steps 100 through 104 describe the output of a first pulse to build up a braking force at the beginning of the control. This pulse is not interrupted until the slipping wheel decelerates again, i.e., when sufficient braking force has been built up for it to affect the wheel characteristics. In addition to determining the wheel acceleration and monitoring the wheel acceleration to determine the occurrence of a braking effect, in other embodiments according to the present invention, this is determined from the actual wheel speed characteristics or by a comparison with a reference value. Another alternative consists of comparing the (measured or estimated) wheel brake pressure with a threshold value that reliably produces a braking effect.

If step 104 indicates that a braking force has appeared on the slipping wheel, the braking force build-up pulse is ended in step 106. Thus, at this time, sufficient pressure has built up on the wheel brake in question for the brake pads to be applied and exert a braking effect regardless of the temperature. After step 106, the slippage of the wheel is calculated in step 108 on the basis of the wheel speed. In an embodiment according to the present invention, this is performed as a function of a reference value such as the wheel speed, the current slippage value being the difference between the current speed and a slippage threshold value derived from the reference value. After calculating the slippage in this embodiment in query step 110, it is checked using the vehicle travel speed whether the system is in the start phase. The start phase is delimited from the regular travel phase by a speed threshold. Furthermore, in an operating situation on a 82 -split road, the start phase is identified when the transmissible drive torque has been reached on the high wheel for the first time. An operating situation during torque control is to be considered equivalent to the start phase if the vehicle no longer decelerates after the start of the control, but accelerates again for the first time. If no start phase is present, the braking force is built up or decreased according to step 112 by having each pulse produce basically the same amount of change in pressure. After step 112, it is checked in step 114 whether the end of the control has been reached. In the embodiment according to the present invention, this is performed using a pressure threshold with the control end being identified when the pressure in the particular wheel, estimated from the build-up and decrease pulses, has dropped below a minimum value. If the control end has been reached, the subprogram is ended; otherwise it is continued with step 108.

If step 110 has resulted in that the vehicle is in the start phase, a strategy different from that of step 112 is pursued for braking force build-up in a preferred embodiment. In step 116, following step 110, it is checked whether a braking force build-up is desirable due to the calculated slippage. If this is the case, the triggering time $T_{AUF}$ for the valve arrangement for pressure build-up is determined according to step 118, for example, on the basis of a table or a characteristic curve as a function of the measured slippage and output. If no braking force build-up is desired according to step 116, it is checked in subsequent step 120 whether the braking force is to be decreased. If this is the case, in step 122 the triggering time $T_{AB}$ for the valve arrangement for decreasing the pressure is determined in one embodiment, also on the basis of the calculated slippage from an existing table. If the pressure is to be kept constant, i.e., no decrease is to follow, steps 118 and 122 are directly followed by step 114.

Figure 3A:
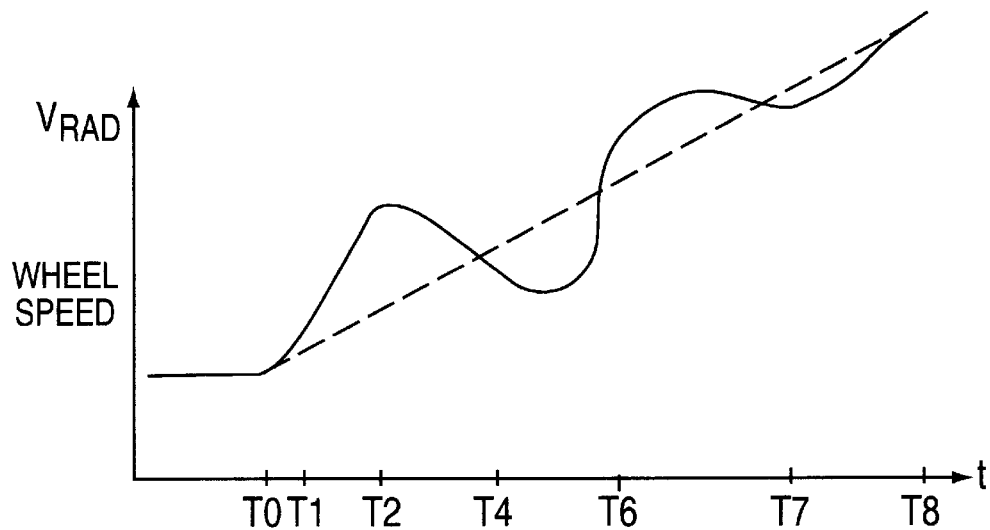
FIG. 3a shows a graph of wheel speed as a function of time.
Figure 3B:
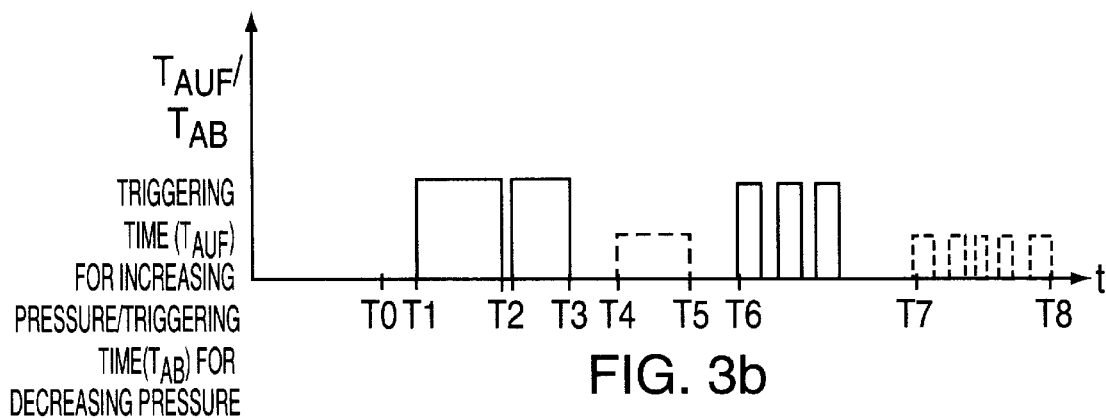
FIG. 3b shows a graph of increase and decrease pulses as a function of time.
Figure 3C:
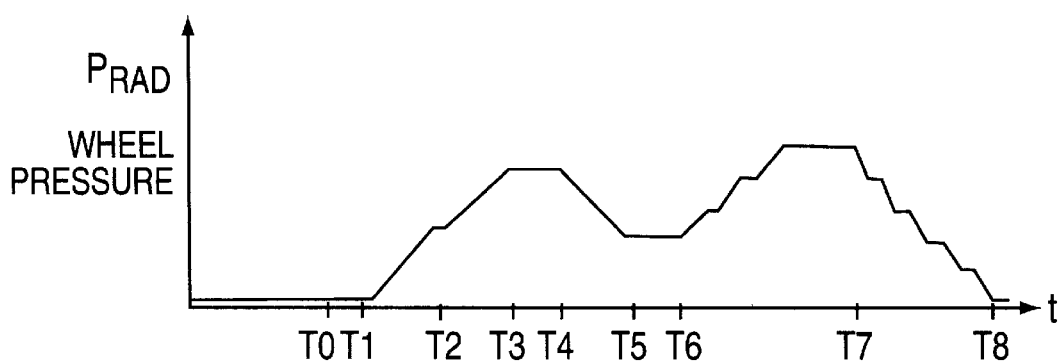
FIG. 3c shows a graph of wheel pressure as a function of time.

The assignment of the triggering times should be adjusted on the basis of the measured slippage so that satisfactory traction characteristics are obtained for both warm and cold hydraulics. It may then happen that traction is somewhat less than optimum with cold hydraulics. FIGS. 3a, 3b and 3c the operation of the process described in FIG. 2 with the help of signal graphs. FIG. 3a shows the variation of the wheel speed $V_{RAD}$ and the reference value (dashed), FIG. 3b shows the variation of the decrease pulses and build-up pulses (dashed), and FIG. 3c shows the variation of the wheel pressure $P_{RAD}$.

At time $T_0$, excessive slippage of a driving wheel occurs in a start situation. After the slippage threshold is exceeded at time $T_1$, this results in a first pulse (filling pulse), which is interrupted at time $T_2$, when the wheel acceleration drops below a threshold value. Similarly, pressure build-up takes place between times $T_1$, and $T_2$. Starting at time $T_2$, the following build-up pulse is determined according to the measured slippage value. The build-up pulse has a length from time $T_2$ to time $T_3$, where pressure build-up takes place, while the pressure is kept constant until time $T_4$. At time $T_4$ a pressure decrease is detected, which results in a $T_5$–$T_4$ long pressure decrease pulse dependent on the measured slippage value. The wheel pressure is therefore decreased between times $T_4$ and $T_5$. Then the start phase is ended. At time $T_6$, the wheel slippage increases again. Since the system is no longer in the start phase, build-up pulses are output, resulting in equal pressure change steps (see times $T_6$ through $T_7$). At time $T_7$, pressure decrease is detected, which results in further pressure decrease pulses, which, in pressure steps of the same length, decrease the pressure to zero at time $T_8$.

In addition to the use in a hydraulic brake system with ABS, ASR and/or FDR functions, as well as corresponding air brake systems, the process according to the present invention is also used in electrically controlled brake systems for traction control.

Extension of the filling pulse and the corresponding configurations of the build-up and possible decrease pulses are used in combination in a preferred embodiment. In other embodiments, either procedure is used for improving traction at low temperatures.

What is claimed is:

1. A process for controlling a brake system of a vehicle including at least one spinning driving wheel, comprising the steps of:

during a first stage which is indicative of a period at a beginning of a traction control, increasing a first braking force on the at least one spinning driving wheel independently of a slippage amount of the at least one spinning driving wheel, and ending an increase of the first braking force on the at least one spinning driving wheel when a predetermined braking effect is detected on the at least one spinning driving wheel; and during a second stage which is indicative of a period when the traction control is active, increasing a second braking force on the at least one spinning driving wheel at a first time, maintaining the second braking force on the at least one spinning driving wheel at a second time, and decreasing the second braking force on the at least one spinning driving wheel at a third time.

2. The process according to claim 1, wherein the braking effect is detected as a function of rotational speed characteristics of the at least one spinning driving wheel.

3. The process according to claim 2, wherein the rotational speed characteristics include a wheel acceleration.

4. The process according to claim 1, further comprising the step of:

in a deceleration period defined to be when the vehicle decelerates during the second stage, determining lengths of build-up pulses of the first braking force as a function of the slippage amount of the at least one spinning driving wheel.

5. The process according to claim 4, wherein, outside of the first stage and of the deceleration period, the first braking force is incremented in steps, each of the steps providing a same amount of change in the first braking force.

6. The process according to claim 1, further comprising the step of:

when the first braking force is increasing, generating a pulse for triggering a valve arrangement, the pulse having a length corresponding to rotational speed characteristics of the at least one spinning driving wheel.

7. The process according to claim 1, further comprising the step of:

during the first stage, determining lengths of build-up pulses of the first braking force as a function of the slippage amount of the at least one spinning driving wheel.

8. The process according to claim 1, wherein the first stage is completed when one of i) a transmissible drive torque is reached on the at least one spinning driving wheel with a high friction, and ii) the vehicle starts moving.

9. The process according to claim 1, wherein the vehicle stops decelerating during the second stage when the vehicle further accelerates during the second stage.

10. A process for controlling a brake system of a vehicle having at least one driven wheel, comprising the steps of:

when the at least one driven wheel is biased to spin, braking the at least one driven wheel by applying a braking force in a traction control; and when a slippage in the at least one driven wheel exceeds a predetermined limit, increasing the braking force applied to the at least one driven wheel using braking pulses, wherein, in at least one of a start phase of the traction control and a deceleration period of the vehicle, lengths of the braking pulses are dependent on the slippage.

11. The process according to claim 10, wherein, at least one of outside the start phase and when the vehicle accelerates, the lengths of the braking pulses are independent of the slippage.

12. The process according to claim 11, wherein each of the braking pulses generates a same amount of change in the braking force.

13. The process according to claim 10, wherein, in the at least one of the start phase and the deceleration period, the braking force is increased.

14. The process according to claim 10, wherein the start phase is completed when one of i) a transmissible drive torque is reached on the at least one driven wheel with a high friction, and ii) the vehicle starts moving.

15. The process according to claim 10, wherein the the deceleration period of the vehicle is ended when the vehicle further accelerates during the traction control.

16. The process according to claim 10, further comprising the step of at least one of i) in the start phase, and ii) during the deceleration period as a function of the slippage, generating the braking pulses which indicate a decrease in the braking force, wherein while outside the start phase and outside the deceleration period, the braking force is decreased in equal steps.

17. The process according to claim 10, wherein at least one of an increase of the braking force, a length of subsequent increasing pulses and a length of subsequent decreasing pulses is predetermined as a function of the slippage to control hydraulics which have at least one of a substantially warm temperature and a substantially cold temperature.

18. A device for controlling a brake system of a vehicle having at least one wheel, comprising:

at least one brake unit controlling a spinning action of the at least one wheel; and an electronic control unit detecting a spin of the at least one wheel and actuating the at least one brake unit to brake the at least one wheel in a traction control when the spin is detected, the electronic control unit increasing a braking force at a beginning of the traction control independently of a slippage of the at least one wheel, the electronic control unit ends an increase of the braking force when a braking effect is detected on the at least one wheel.

19. A device for controlling a brake system of a vehicle including at least one wheel, comprising:

at least one brake unit controlling a spinning action of the at least one wheel; and an electronic control unit detecting a spin of the at least one wheel and actuating the at least one brake unit to brake the at least one wheel in a traction control when the spin is detected, the electronic control unit predefining pulses for at least one of increasing the braking force and decreasing the braking force, wherein, in at least one of a start phase of the traction control and a deceleration period of the vehicle in the traction control, a length of at least one of braking force increase pulses and braking force decrease pulses is dependent on a slippage of the at least one wheel.

* * * * *

UNITED STATES PATENT AND TRADEMARK OFFICE
CERTIFICATE OF CORRECTION

PATENT NO.    : 6,076,900
DATED         : June 20, 2000
INVENTOR(S)   : Juergen Jung, Norbert Polzin and Michael Hund It is certified that error appears in the above-identified patent and that said Letters Patent is hereby corrected as shown below:

Column 1,
Line 36, change "minimizing" to -- minimize --.
Line 36, change "influence the" to -- influence of the --.

Column 4,
Line 56, after hydraulics, insert new paragraph.
Line 56, change "3c the" to -- 3c show the --.

Signed and Sealed this

Sixteenth Day of October, 2001

Attest:

NICHOLAS P. GODICI
Attesting Officer
Acting Director of the United States Patent and Trademark Office